July 5, 1966     E. J. ST. COEUR     3,258,966
DEPTH PRESSURE GAUGE
Filed Dec. 6, 1963
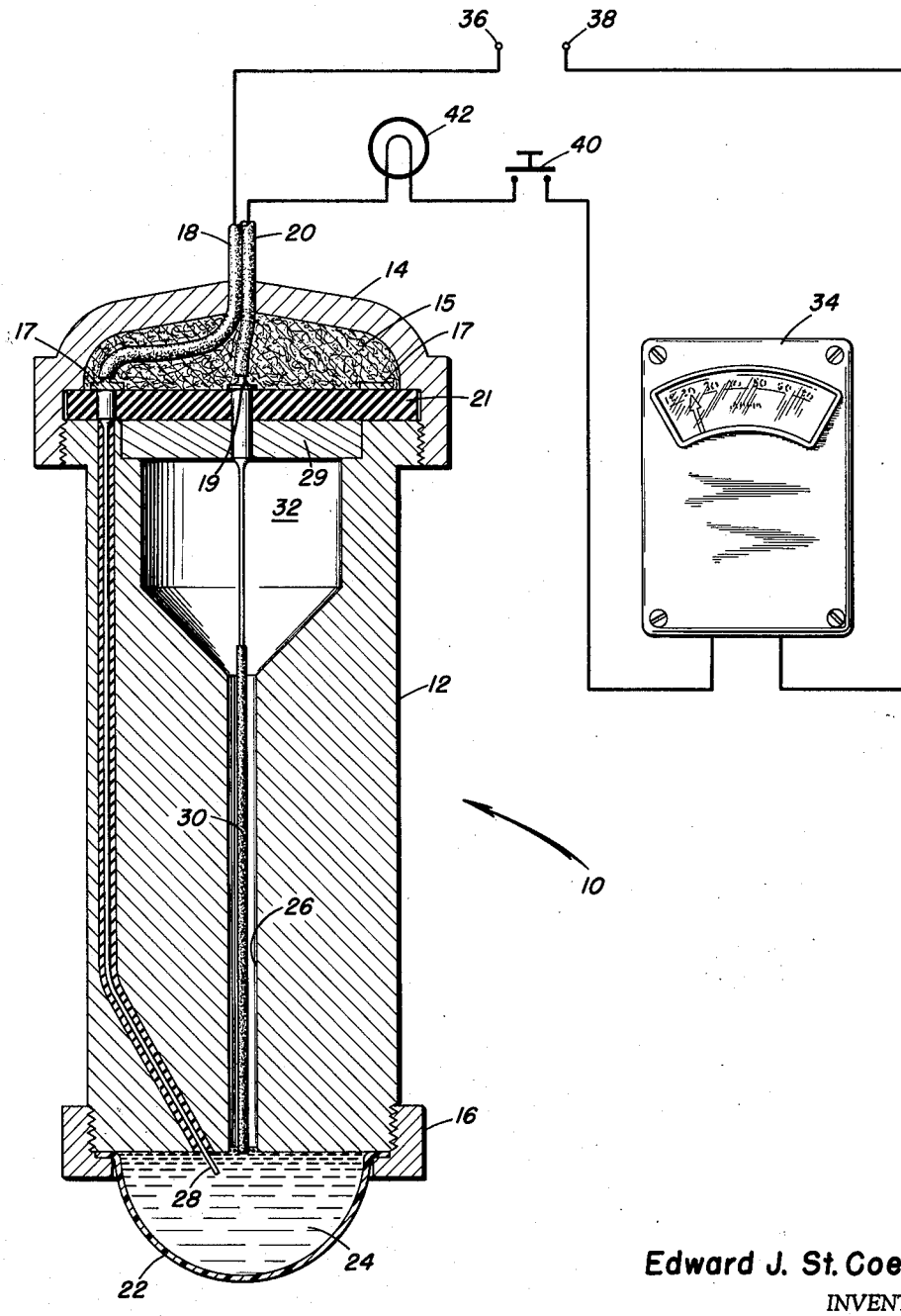
Edward J. St. Coeur
INVENTOR
BY *Walter G. Finch*
ATTORNEY 3,258,966
DEPTH PRESSURE GAUGE
Edward J. St. Coeur, Joppa, Md., assignor of twenty-four percent each to William B. Snyder, Sr., and William B. Snyder, Jr., both of Joppa, Md.
Filed Dec. 6, 1963, Ser. No. 328,620
3 Claims. (Cl. 73—300)

This invention relates generally to measuring instruments, and more particularly it pertains to a fluid pressure gauge.

It is an object of this invention to provide a gauge for measuring the relative pressure of fluid in which it is immersed.

Another object of the invention is to provide a remote indicating volume or depth gauge for fluids which operates electrically over wires and which is safe for use even in inflammable liquid.

To provide a metering device which continuously indicates any change in the pressure of a communicating liquid, is still another object of this invention.

Other objects and attendant advantages of this invention will become more readily apparent and understood from the following detailed specification and accompanying drawing incorporating features of the invention.

Referring now to the details of the invention, reference numeral 10 designates generally a gauge incorporating important features of this invention. The gauge 10 consists of a solid cylindrical fluid tight housing 12 which is closed by caps 14 and 16 at each end.

The upper cap 14 is provided with entrance means such as a packing gland or sealing compound 15 for the hermetically tight passage of a pair of insulated electric conductors 18 and 20 to the interior of the housing 12.

The connections at 19 and 17 may be rotary brush-and-ring type on an insulating gasket 21.

The other or lower cap 16 is ring-shaped and provided with a flexible bladder or bellows 22 of preferably non-conducting material, such as leather or plastic. This bladder or bellows 22 is filled with a conducting liquid 24 such as mercury and communicates with a bore or vertical passage 26 of small diameter formed in the housing 12.

One of the conductors 18 is electrically connected to the mercury 24 by an exposed end or electrode 28. The other conductor 20 is attached electrically to an electrically resistive wire or rod 30 of such material as Nichrome or graphite. The rod 30 makes no direct electrical contact with the housing 12 being supported on insulated means 29 at its upper end so as to depend co-axially the entire length of the bore 26. The upper end of this bore 26 is enlarged to form an air chamber 32 of relatively large volume.

When the gauge 10 is immersed in a fluid the pressure of the fluid is exerted against the bellows 22 and forces the mercury 24 to rise within the bore 26 and compress the air in chamber 32. The mercury, as it rises, electrically shunts out a portion of the resistive rod 30. If the conductors 18 and 20 are connected to a series arrangement of a current meter 34 and a source of electric power connected to leads 36 and 38, more current will flow as the mercury level rises in the bore 26. Thus, the current indication on meter 34 is a direct reading of the relative pressure between the air in chamber 32 and that of the fluid in which the gauge 10 is immersed.

The meter 34 can be calibrated to read this pressure difference in pounds per square inch or it can be marked to indicate depth of immersion of the gauge, altitude, or volume (in a container). If the device, is used as a barometer, calibration would be in inches of mercury.

If desired a push button 40 may be inserted in the electric wiring to save power from the power source 36, 38 and give meter indication only when required. This momentarily type of use will overcome any inaccuracies due to $I^2R$ losses and possible heating within the gauge.

Another refinement includes in the electric circuit a lamp 42 which will begin to glow as the measured value increases and can be selected to give full brilliancy at any maximum value desired.

It is to be particularly noted that the pressure gauge described can be utilized as an altimeter, if desired, if the tube or passageway is filled with mercury at atmosphere or sea level. Such a modified device would act as a barometer and would give electrical indications.

Obviously many modifications and variations of the present invention are possible in light of the above teachings. It is, therefore, to be understood that within the scope of the appended claims the invention may be practiced otherwise than as specifically described.

What is claimed is:

1. A device for measuring the pressure of a fluid, comprising a solid cylindrical structure having a pair of longitudinal passages extending therethrough and a chamber communicating with the upper end of one of said passages, upper and lower cap means hermetically sealing each end of said cylindrical structure, with said lower cap means having an aperture therethrough, pressure sensitive means positioned within said aperture and forming a cavity with the lower end of said cylindrical structure, electrically conductive liquid contained in said cavity, an electrical circuit including a resistance rod element depending the length of said one passage free of electrical contact with said cylindrical structure and communicating with said electrically conductive liquid and a pair of conductors, one of said conductors communicating with said electrically conductive liquid and the other of said conductors connected to the upper end of said resistance means so that pressure exerted against said pressure sensitive means causes said electrically conductive liquid to rise in said one passage to shunt a corresponding portion of said resistance rod element, with the diameter of said chamber being large relative to the diameter of said one passage so as to provide a space of relatively large volume for the compression of air in said chamber during said rise of said electrically conductive liquid, whereby said pressure is measurable as a change in current flowing through said electrical circuit, and insulating means positioning the upper end of said resistance rod element.

2. The device as recited in claim 1 wherein said one conductor is in two longitudinal sections and rotary brush-and-ring type connectors are provided at the upper end of said cylindrical housing for connecting said longitudinal sections together and said other conductor to said resistance rod element.

3. The device as recited in claim 1, wherein said pressure sensitive means is a bellows.

References Cited by the Examiner
UNITED STATES PATENTS

| | | | |
|---|---|---|---|
| 2,459,268 | 1/1949 | Elkins | 73—300 |
| 2,931,225 | 4/1960 | Pleuger | 73—300 |

FOREIGN PATENTS 683,742  12/1952  Great Britain.

LOUIS R. PRINCE, *Primary Examiner.*

ISAAC LISANN, F. H. THOMSON,
*Assistant Examiners.*